United States Patent
Thompson et al.

(10) Patent No.: US 10,986,773 B2
(45) Date of Patent: Apr. 27, 2021

(54) LOOK-AHEAD FUNCTIONALITY TUNING FOR INDEPENDENT SECTIONS

(71) Applicant: CNH Industrial Canada, Ltd., Saskatoon (CA)

(72) Inventors: Dennis George Thompson, Eagle Ridge (CA); Jay Forrest, Saskatoon (CA); Benjamin McKnight, Aberdeen (CA); Jack Donald Turner, Saskatoon (CA); Graham Douglas Stuart, Warman (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 253 days.

(21) Appl. No.: 16/279,459

(22) Filed: Feb. 19, 2019

(65) Prior Publication Data
US 2020/0260637 A1    Aug. 20, 2020

(51) Int. Cl.
*A01C 15/00*    (2006.01)
*G05D 7/06*    (2006.01)
*A01C 7/04*    (2006.01)

(52) U.S. Cl.
CPC .......... *A01C 15/005* (2013.01); *G05D 7/0611* (2013.01); *A01C 7/04* (2013.01)

(58) Field of Classification Search
CPC ....... A01C 15/005; A01C 7/04; G05D 7/0611
USPC .................................................. 700/231–244
See application file for complete search history.

(56) References Cited

U.S. PATENT DOCUMENTS

| | | | | |
|---|---|---|---|---|
| 5,873,227 A * | 2/1999 | Arner | ................. | A01D 41/1274 56/10.2 G |
| 5,996,516 A | 12/1999 | Benneweis et al. | | |
| 6,024,035 A * | 2/2000 | Flamme | ............... | A01B 79/005 111/178 |
| 6,263,650 B1 * | 7/2001 | Deutsch | ............... | A01D 46/082 56/16.4 B |
| 6,296,425 B1 * | 10/2001 | Memory | ................ | A01C 7/105 406/197 |
| 6,901,732 B2 * | 6/2005 | Bares | ..................... | A01D 46/08 100/88 |

(Continued)

OTHER PUBLICATIONS

"Precision Air: Air Carts," Case IH, CNH Industrial America LLC, 2019 (https://www.caseih.com/northamerica/en-us/products/planing-seeding/precision-air-carts).

(Continued)

*Primary Examiner* — Michael Collins
(74) *Attorney, Agent, or Firm* — Rebecca L. Henkel; Rickard K. De Mille

(57) ABSTRACT

An agricultural product delivery system having a controller with a non-transitory computer readable medium configured to store instructions and a processor configured to execute the instructions. The instructions may include instructions to determine a first time-to-target of a first metering section of an agricultural implement in a field, determine a second time-to-target of a second metering section of the agricultural implement in the field, control a first motor coupled to the first metering section to an ON state when the first time-to-target is less than or equal to a first delivery delay of the first metering section, and control a second motor coupled to the second metering section to the ON state when the second time-to-target is less than or equal to a second delivery delay of the second metering section.

20 Claims, 3 Drawing Sheets

(56) References Cited

U.S. PATENT DOCUMENTS

| | | | |
|---|---|---|---|
| 7,648,413 B2 * | 1/2010 | Duquesne | A01D 41/127 460/112 |
| 8,132,521 B2 | 3/2012 | Snipes et al. | |
| 8,196,534 B2 | 6/2012 | Meyer et al. | |
| 8,781,694 B1 * | 7/2014 | Sheidler | A01D 41/1274 701/50 |
| 8,825,311 B2 | 9/2014 | Kowalchuk | |
| 8,857,353 B2 | 10/2014 | Kowalchuk | |
| 8,893,630 B2 | 11/2014 | Kowalchuk | |
| 8,915,200 B2 | 12/2014 | Barsi et al. | |
| 8,950,260 B2 | 2/2015 | Gelinske et al. | |
| 9,497,899 B2 | 11/2016 | Glowa et al. | |
| 9,609,803 B2 | 4/2017 | Gervais et al. | |
| 9,756,777 B2 * | 9/2017 | Chahley | H04L 63/062 |
| 9,788,475 B2 | 10/2017 | Henry | |
| 9,936,626 B2 | 4/2018 | Chahley et al. | |
| 10,051,779 B2 * | 8/2018 | Chahley | G06F 21/575 |
| 10,524,408 B2 * | 1/2020 | Chahley | G06F 21/575 |
| 2003/0060245 A1 * | 3/2003 | Coers | A01D 41/127 460/2 |
| 2013/0061790 A1 * | 3/2013 | Binsirawanich | A01C 7/081 111/174 |
| 2013/0124055 A1 | 5/2013 | Baurer et al. | |
| 2014/0076218 A1 | 3/2014 | Liu | |
| 2014/0277965 A1 | 9/2014 | Miller et al. | |
| 2016/0330901 A1 | 11/2016 | Arnold et al. | |
| 2017/0112060 A1 * | 4/2017 | Noonan | A01D 46/08 |
| 2017/0196162 A1 | 7/2017 | Sheppard et al. | |

OTHER PUBLICATIONS

"Machinery: New eagle-eyed metering system for Seed Hawk air carts," Grain Central, Feb. 13, 2013 (https://www.graincentral.com/machinery/eagle-eyed-metering-system-boosts-seed-hawk-capabilities/).

* cited by examiner

LOOK-AHEAD FUNCTIONALITY TUNING FOR INDEPENDENT SECTIONS

BACKGROUND

The present disclosure relates generally to the control of metering systems for particulate agricultural products.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are towed behind a work vehicle, such as a tractor. These implements generally contain a particulate agricultural products, such as seeds, fertilizer, and/or other agricultural products, which is distributed on or in the ground using various methods. An air cart may be towed with the agricultural implement to hold the agricultural product to be delivered to the field by the metering systems of the agricultural implement. The particulate material is distributed to the rows in a field from the metering systems. The metering systems of the agricultural implement are arranged on the agricultural implement to deliver the agricultural product to multiple rows. The path length from the air cart to the metering systems may vary based on the arrangement of the metering system and the seeding implement configuration (e.g. working width, row spacing, etc.). Unfortunately, this varied path length may lead to over-application or under-application of the agricultural product to the field due to the difference in travel time for the metered product to reach ground.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

A first embodiment describes an agricultural product delivery system having a controller with a non-transitory computer readable medium configured to store instructions and a processor configured to execute the instructions. The instructions include instructions to determine a first time-to-target of a first metering section of an agricultural implement in a field, determine a second time-to-target of a second metering section of the agricultural implement in the field, control a first motor coupled to the first metering section to an ON state when the first time-to-target is less than or equal to a first delivery delay of the first metering section, and control a second motor coupled to the second metering section to the ON state when the second time-to-target is less than or equal to a second delivery delay of the second metering section.

A second embodiment describes an agricultural product delivery system that includes a first metering assembly, a second metering assembly, and a controller. The first metering assembly includes a first metering section having a first opener disposed at a first location on an agricultural implement and a first distribution hose coupled to the first opener. The first metering assembly includes a first motor configured to control a first flow of a first agricultural product into a first primary line coupled to the first distribution hose. The second metering assembly includes a second metering section having a second opener disposed at a second location on the agricultural implement and a second distribution hose coupled to the second opener. The second metering assembly includes a second motor configured to control a second flow of a second agricultural product into a second primary line coupled to the second distribution hose. The first metering assembly includes a first path length through the first primary line and the first distribution hose, and the second metering assembly includes a second path length through the second primary line and the second distribution hose. The controller is coupled to the first motor and the second motor. The controller is configured to control the first motor based at least in part on the first path length, to control the second motor based at least in part on the second path length, and to independently control the first motor and the second motor.

A third embodiment describes a method of controlling delivery of an agricultural product to a field from a plurality of metering sections of an agricultural implement. The method includes determining a first delivery delay for a first metering assembly based at least in part on first flow feedback from a first flow sensor of the first metering assembly and first state change of a first motor of the first metering assembly, and controlling the first motor of the first metering assembly to deliver the agricultural product to the field via a first metering section of the first metering assembly based at least in part on the first delivery delay. The method includes determining a second delivery delay for a second metering assembly based at least in part on second flow feedback from a second flow sensor of the second metering assembly and a second state change of a second motor of the second metering assembly, and controlling the second motor of the second metering assembly to deliver the agricultural product to the field via a second metering section of the second metering assembly based at least in part on the second delivery delay and independent of the first delivery delay.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
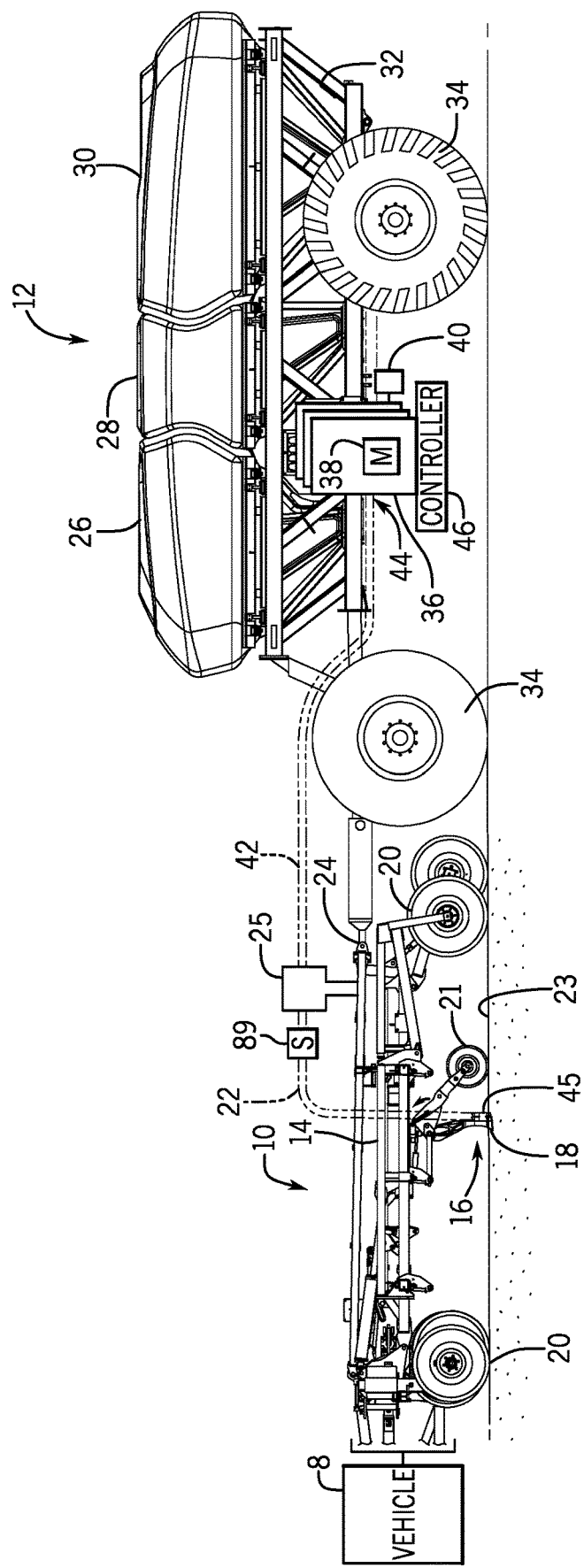
FIG. 1 is a side view of an agricultural implement with an air cart, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to systems and methods for independently controlling the delivery of a granular agricultural product to the field from a plurality of openers of an agricultural implement. One or more agricultural products may be distributed from one or more containers to the agricultural implement with the plurality of openers. The agricultural implement may have the plurality of metering sections, and each metering section of the plurality of sections of the agricultural implement may distribute agricultural product to one or more openers of the metering section. A distribution header of the metering sections of the agricultural implement may receive the agricultural product from primary hoses coupled to a motor of an air cart configured to meter a respective flow of the one or more agricultural products, and then distribute the agricultural product to the openers via distribution hoses. Through independent control of the respective motors connected to the plurality of sections, the systems and methods described herein may deliver the one or more agricultural products to desired locations of the field while reducing over-application or under-application of the one or more agricultural products to locations of the field. Furthermore, the systems and methods described herein may facilitate distribution of the one or more agricultural products to rows of the field at different times for each row section. For example, sections of the agricultural implement may encounter the row end of respective rows of the field at different times as the agricultural implement enters or exits the field. Flow sensors in the distribution hoses may be used to determine a time difference between activation of a motor and when the one or more agricultural products are delivered to the field via openers of the section. Independent control of the motors connected to the sections of the agricultural implement based at least in part on this time difference may facilitate delivery of the one or more agricultural products while reducing over-application or under-application to the field. In some embodiments, feedback from flow sensors of the openers of each section may be used to automatically establish and regularly monitor product delivery time delays without operator input.

To help illustrate, a side view of an agricultural implement 10 coupled to an air cart 12 is shown in FIG. 1. As depicted, the agricultural implement 10 includes a tool frame 14 coupled to an opener 16, including a ground-engaging tool 18 (e.g., seed boot), and wheel assemblies 20. The agricultural implement may be pulled by an off-road work vehicle 8 (e.g., a tractor) to deposit rows of product. Accordingly, the wheel assemblies 20 may contact the soil surface to enable the agricultural implement 10 to be pulled by the off-road work vehicle 8. As the agricultural implement 10 is pulled, a row of product may be deposited in the soil 23 by the opener 16. Although only one opener 16 is shown in FIG. 1, the agricultural implement 10 may include multiple openers 16 organized in a row or multiple rows across the agricultural implement 10. In some embodiments, the agricultural implement 10 may include 4, 6, 8, 10, 12, 14, 16, 18, 20, or more openers 16, which may each deposit a row of seeds and/or other agricultural products (e.g., fertilizer, inoculant) in the soil 23.

To facilitate depositing agricultural products, each opener 16 includes the ground-engaging tool (e.g. seed boot) 18, a distribution hose 22, and a press wheel 21. More specifically, when the seed boot 18 engages the soil 23, the seed boot 18 exerts a downward force that excavates a trench into the soil 23 as the opener 16 travels across the soil 23. As the agricultural implement 10 moves through the field, the opener 16 may deposit seeds from an outlet 45 of the distribution hose 22 into the excavated trench. Then, the press wheel 21 may pack soil 23 onto the deposited seeds. In some embodiments, multiple openers 16 may be grouped together in a meter section. A distribution header 25 of each meter section may receive the agricultural product from a primary line 42, then distribute the agricultural product via one or more distribution hoses 22 of the openers 16.

The flow rate of seeds from the opener 16 to the soil 23 may be controlled by the metering rate of seeds from the air cart 12. In some embodiments, the air cart 12 may pneumatically distribute the seeds or other granular agricultural products to the opener 16 via an inlet 44 of the primary line 42. The air cart 12 may control the seed flow rate from the opener 16 by controlling the rate at which seeds are supplied to the opener 16 via a metering device 36 coupled to the primary line 42. In some embodiments, a motor 38 of the metering device 36 may be controlled to adjust the rate of seeds into the metering device 36 from a product container. The motor 38 may be an electric motor, a pneumatic motor, or a hydraulic motor. An air supply 40 coupled to the metering device 36 may be configured to direct an airflow through (or below via a venturi device) the metering device 36 to convey the seeds to the opener 16 via the inlet 44 of the primary line 42. The air cart 12 may supply seeds to multiple openers 16 via multiple metering devices 36, and each metering device 36 may supply seeds via the primary line 42 to a respective distribution header 25. In some embodiments, the air cart 12 may have one metering device 36 per opener 16. In some embodiments, the air cart 12 may have one metering device 36 for a metering section with a distribution header 25 for group of two, three, four, or more adjacent openers 16.

In the depicted embodiment, the air cart 12 is towed behind the agricultural implement 10. More specifically, the agricultural implement 10 may be coupled to the off-road work vehicle 8 by a first hitch assembly, and the air cart 12 may be coupled to the agricultural implement 10 by a second hitch assembly 24. However, in other embodiments, the agricultural implement 10 may be towed behind the air cart 12. In further embodiments, the implement 10 and the air cart 12 may be part of a single unit that is towed behind an off-road work vehicle 8, or the implement 10 and the air cart 12 may be elements of a self-propelled vehicle.

The air cart 12 may centrally store seeds and distribute the seeds to the openers 16. The air cart 12 may have multiple product containers 26, 28, and 30, a frame 32, and wheels 34. The product containers 26, 28, 30 may store the same or different agricultural products. For example, the product container 26 may store legume seeds while the product container 28 may store a dry fertilizer. In some embodiments, one of the product containers 26, 28, 30 may store granular inoculants, which are planted in conjunction with the legume seeds. In such configurations, the air cart 12 may deliver seed, fertilizer, and inoculant to the implement 10 via separate metering devices 36, or as a mixture through a single metering device 36. The hitch assembly 24 is coupled between the tool frame 14 and the air cart frame 32, which enables the air cart 12 to be towed with the agricultural implement 10. The metering devices 36 coupled to the product containers distribute the agricultural products (e.g., seed, fertilizer, inoculant) to the openers 16 of the agricultural implement via the distribution headers 25.

A controller 46 may be coupled to the metering devices 36 to control the state and/or the speed of the motor 38. For example, the controller 46 may control the motors 38 to start a flow of the agricultural product through the metering device 36 into the inlet 44 of the primary line 42, to stop the flow of the agricultural product, or to adjust the amount of the agricultural product in the flow through the inlet 44 of the primary line 42. The path length of the distribution hoses 22 and primary line 42 between the inlets 44 at the metering devices 36 and the outlets 45 at the respective opener 16 may vary. For example, a first path length for the agricultural product through the first inlet of a first metering device, the respective primary line 42, a first distribution header 25, a first distribution hose 22, and a first inlet 44 of a first opener may be greater than a second path length for the agricultural product through a second inlet of a second metering device, the respective primary line 42, a second distribution header 25, a second distribution hose 22, and a second inlet 44 of a second opener 16. In some embodiments, friction factors along the path length through the distribution hose 22 and the primary line 42 between the inlet 44 and the outlet 45 for a respective opener may affect the internal velocity and flow rate of the agricultural product. The friction factors may affect an equivalent path length to the openers 16. That is, a first effective path length for a first opener may be greater than a second effective path length for a second opener due to increased friction factors despite the same longitudinal path length for the first and second openers. Friction factors that may increase an equivalent path length may include decreasing bend radius, increasing the quantity of turns along the path length, and restrictions in the diameter along the path length, among others. As discussed in detail below, the controller 46 may utilize flow sensors 89 of the agricultural implement 10 to determine a delay between a first time when the state of the motor 38 of a metering device 36 is changed (e.g., turned ON) to meter the agricultural product to the opener 16 and a second time when the agricultural product arrives at the opener 16. The controller 46 may be disposed on the vehicle 8, the agricultural implement 10, or the air cart 12.

Figure 2:
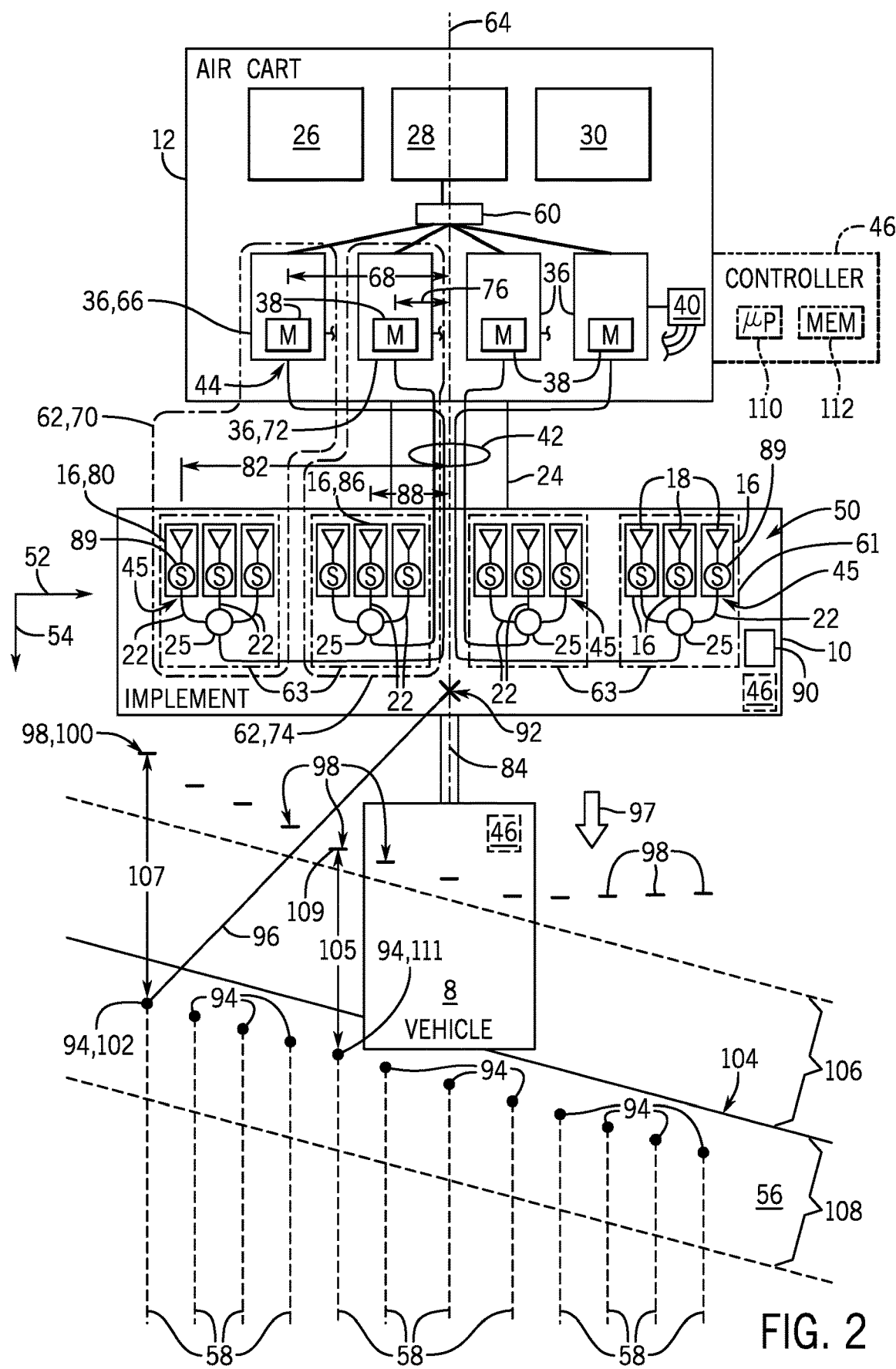
FIG. 2 is a block diagram of an embodiment of an agricultural product delivery system in a field with the agricultural implement having metering systems to deliver the agricultural product to rows of the field.

FIG. 2 illustrates a block diagram of an embodiment of an agricultural product delivery system 48. As discussed above, the agricultural implement 10 may have a row 50 of multiple openers 16, such as the twelve openers 16 illustrated in FIG. 2. The row 50 of openers 16 extends along a delivery axis 52 that is substantially perpendicular to a direction 54 of travel. In some embodiments, the agricultural implement 10 may have multiple rows 50 of openers that extend along the delivery axis 52. The vehicle 8 may lead the agricultural implement 10 and the air cart 12 across a field 56 in the direction 54 of travel to form rows 58 of the field 56.

The one or more agricultural products in the product containers 26, 28, 30 may be directed to a meter subhopper 60 of the air cart 12. Although FIG. 2 illustrates one meter subhopper 60 coupled to the product container 28 and metering devices 36, it is appreciated that in some embodiments, each product container 26, 30 may be coupled to a respective subhopper and respective metering devices for distribution of the respective agricultural products of the product containers 26, 30. The meter subhopper 60 distributes the one or more agricultural products to the metering devices 36. The motor 38 of each metering device 36 may control the amount and/or the rate at which the one or more agricultural products are directed from the meter subhopper 60 to the respective inlet 44 of the primary line 42 coupled to the respective metering device 36. The metering devices 36 may receive an airflow from the air supply 40 to facilitate directing the one or more agricultural products through the primary line 42. The primary line 42 of each metering device 36 may be coupled to a respective distribution header 25 that distributes the received agricultural product to the openers 16 of a metering section 63 via the distribution hoses 22. Each opener 16 of the agricultural implement 10 is coupled to the respective outlet 45 of the distribution hose 22. The outlet 45 of the distribution hose 22 of each opener 16 may be coupled near the seed boot 18 of the respective opener 16, thereby facilitating delivery of the one or more agricultural products into the opening (e.g., trench) in the soil formed by the seed boot (or ground-engaging tool) 18. Although FIG. 2 illustrates an embodiment of the agricultural implement 10 with four metering sections 63, with each metering section 63 having one distribution header 25 configured to supply the agricultural product to three openers 16, it may be appreciated that other embodiments may have different quantities of metering sections and/or different quantities of openers per metering section.

As discussed herein, the term metering assembly 62 refers to a metering device 36, a primary line 42, a distribution header 25, the openers 16 coupled to the distribution header 25, and the distribution hoses 22 coupled between the distribution header 25 and the openers 16. Each metering assembly 62 is configured to route agricultural product from the product containers 26 to a group of rows 58 of the field 56. The components of two metering assemblies 62 of the agricultural implement 10 are shown with dashed circles 62 in FIG. 2. Accordingly, the agricultural product delivery system 48 includes multiple metering assemblies 62, with components of the metering assemblies 62 disposed on the agricultural implement 10, the air cart 12, or any combination thereof.

A delivery delay is a measure of the elapsed time for agricultural product to travel from the metering device 36 to the soil. The delivery delay for each meter section 63 or each opener 16 is based at least in part on a path length from the metering device 36 to the opener 16. The path length for each opener may include a primary length of the primary line 42 and a secondary length of the distribution hose 22. The path lengths of the primary line 42 and the distribution hose 22 of each metering assembly 62 may vary based on numerous factors. For example, the position of the metering device 36 on the air cart 12, the position of the distribution header 25 of the metering section 63 on the agricultural implement 10, the routing of the primary line 42 on the air cart 12, the position of the openers 16 on the agricultural implement, the routing of the distribution hose 22 on the agricultural implement 10, and the bend radii of the primary line 42 and the distribution hose 22. In some embodiments, the primary line 42 may be routed along or near the hitch assembly 24 near a cart axis 64 of the air cart 12, yet one or more of the metering devices 36 may be arranged away from the axis 64. For example, a first metering device 66 of a first metering assembly 70 may be offset a first distance 68 from the cart axis 64, and a second metering device 72 of a second metering assembly 74 may be offset a second distance 76 from the cart axis 64. In some embodiments, the first length of the primary line 42 for the first metering assembly 70 may be greater than the second length of the primary line 42 for the second metering assembly 74 by 1, 2, 3, 5, or 10 feet or more. In some embodiments, a first opener 80 of the first metering assembly 70 may be offset a third distance 82 from an implement axis 84 of the agricultural implement 10, and a second opener 86 of the second metering assembly 74 may be offset a fourth distance 88 from the implement axis 84. The first length of the distribution hose 22 of the first metering assembly 70 may be greater than the second length of the distribution hose 22 of the second metering assembly 74 due to the increased lateral offset of the first metering assembly 70 relative to the axes 64, 84 than the components of the second metering assembly 74. That is, the first distance 68 is greater than the second distance 76, and the third distance 82 is greater than the fourth distance 88. In some embodiments, the first distribution length of the distribution hose 22 to the first opener 80 may be greater than the second distribution length of the distribution hose to the second opener 86 by 3, 6, 12, 24, 36, or 48 inches or more. In some embodiments, the distribution hoses 22 of each metering section 63 are arranged to reduce or eliminate variations in the distribution length from the distribution header 25 to the openers 16.

In some embodiments, flow sensors 89 may be disposed on one or more of the distribution hoses 22 of the metering systems 63. The flow sensors may include, but are not limited to optical flow sensors such as a BlackEye sensor from DigiTroll of Hajduszoboszlo, Hungary. In some embodiments, the flow sensors 89 are arranged near the boot 18 of the opener 16. The flow sensors 89 may be configured to provide feedback to the controller 46, such as a flow state (e.g., flowing, not flowing) and/or a count of a quantity of agricultural product through the flow sensor 89. Based at least in part on feedback from a respective flow sensor 89, the controller 46 may determine a delivery delay for the flow path from the metering device 36 to the opener 16 corresponding to the respective flow sensor 89. As discussed herein, the controller 46 may independently control the motors 38 of the metering devices 36 to account for a first delivery delay of the first metering assembly 70 and a second delivery delay of the second metering assembly 74. In some embodiments, the delivery delay for a distribution hose of a metering assembly 62 is between approximately 0.5 to 5.0 seconds, 1.0 to 4.0 seconds, or approximately 2.0 to 3.0 seconds. For example, to simultaneously start delivering the agricultural product to the first opener 80 and the second opener 86, the controller 46 may independently control the motor of the first metering device 66 to start metering agricultural product to the first opener 80 prior to controlling the motor of the second metering device 72 to start metering agricultural product to the second opener 86 because the first delivery delay to the first opener 80 is greater than the second delivery delay to the second opener 86. In some embodiments, the controller 46 is configured to scale or otherwise adjust the delivery delay based at least in part on a type of agricultural product and/or an air pressure of the airflow from the air supply 40. For example, the delivery delay may be greater for legume seeds than for cereals. Additionally, or in the alternative, the delivery delay may be reduced if the air pressure is increased.

In some embodiments, a location device 90 coupled to the controller 46 is configured to determine a position of the agricultural implement 10 in the field 56. The location device 90 may be disposed on the vehicle 8, the agricultural implement 10, or the air cart 12. Based on input (e.g., location feedback) from the location device 90, the controller 46 may determine the location of a reference point 92 of the agricultural implement 10 in the field 56. Based on the determined location of the reference point 92, the controller 46 may determine the respective locations of the metering sections 63 in the field 56. As will be appreciated, the location device 90 may include any suitable system configured to determine the position of the agricultural implement 10, such as a global positioning system (GPS), for example. In certain embodiments, the location device 90 may be configured to determine the position of the agricultural implement 10 relative to a fixed point within the field 56 (e.g., via a fixed radio transceiver). Accordingly, the location device 90 may be configured to determine the position of the agricultural implement 10 relative to a fixed global coordinate system (e.g., via the GPS) or a fixed local coordinate system. In some embodiments, the location device 90 may enable the controller 46 to determine a speed of the agricultural implement 10 during operation.

The controller 46 may determine and/or receive target locations in the field 56 to deliver the one or more agricultural products. The controller 46 may control the motors 38 of the metering devices 36 to deliver the one or more agricultural products to the target locations (e.g., rows) of the field 56 without delivering the one or more agricultural products to other locations of the field 56, such as head rows and/or locations where the one or more agricultural products were previously applied. For example, the controller 46 may determine the time-to-target of the first opener 80 to a first target location 102 based at least in part on a first distance 96 from the reference point 92 to the first target location 102, a speed 97 of the agricultural implement 10, and the third distance 82 that relates the first opener 80 to the reference point 92. Utilizing the delivery delay of the first metering assembly 70, the controller 46 may determine when to control the first motor 38 of the first metering device 66 to an ON state to initiate delivery of the one or more agricultural products to the first target location 102. In some embodiments, the controller 46 may control the first motor of the first metering assembly 70 to the ON state when the first time-to-target is less than or equal to a first delivery delay of the first distribution hose 22 of the first metering assembly 70. In a similar manner, the controller 46 may determine respective times-to-target for other openers 16 to deliver the one or more agricultural products to respective target locations in the field 56. Accordingly, the controller 46 may utilize its determined location in the field 56 to look ahead to where the agricultural implement will be and control the meter assemblies 62 to independently and accurately deliver the one or more agricultural products to desired locations 94 in the field 56.

In some embodiments, the controller 46 may dynamically determine the locations of components of the metering assembly 62 while the agricultural implement 10 travels. The controller 46 may determine trigger locations 98 such that when a component (e.g., opener 16, metering section 63, metering device 36) of a metering assembly 62 is disposed at the respective trigger location 98 relative to a desired location 94 in the field 56, the controller 46 controls the respective motor of the metering assembly 62 to the ON state. In some embodiments, the trigger locations 98 may be determined based on the speed 97 of the agricultural implement, the delivery delay through the primary line 42 and the distribution hose 22, and the distance 96 to the target location. For example, the controller 46 may determine a first trigger location 100 based on the speed 97 of the agricultural implement, the first target location 102, and the delivery delay of the primary line 42 and the distribution hose 22 of the first metering assembly 70. That is, when the controller 46 determines the first opener 80 is at or has passed the first trigger location 100, the controller 46 may control the motor 38 of the first metering device 66 to the ON state so that the one or more agricultural products may be delivered to the first target location 102. Although FIG. 2 illustrates the first trigger location 100 for the first opener 80, it may be appreciated that the controller 46 may determine the first trigger location 100 for the meter section 63 of the first meter assembly 70 to control the motor 38 of the first metering device 66 to the ON state to deliver the one or more agricultural products from the group of openers 16 of the respective meter section 63. Continuing this example, FIG. 2 illustrates an array of locations 98 at which the controller 46 may independently control the motors 38 of the metering assemblies 62 such that the one or more agricultural products are delivered to the respective target locations 94 in the field 56. It may be appreciated that the trigger locations 98 graphically indicate the locations on the field 56 at which the time-to-target for a respective opener 16 are equal to the delivery delay of primary line 42 and the distribution hose 22 coupled to the respective opener 16. For example, a distance 105 between a second trigger location 109 and the target location 111 for the second opener 86 is shorter than a distance 107 between the first trigger location 100 and the target location 102 for the first opener 80. This may be at least in part because of the longer primary line 42 for the first opener 80 relative to the shorter primary line 42 for the second opener 86.

In a similar manner as discussed above, the controller 46 may independently control the motors 38 of the metering devices 36 to the OFF state so that the one or more agricultural products are not delivered to determined locations on the field 56. For example, the agricultural implement 10 may travel across the field 56 along a path such that one or more of the metering sections 63 traverse a portion of the field 56 that received the one or more agricultural products during a prior pass of the agricultural implement 10. That is, one or more openers 16 of the agricultural implement 10 may travel across a path that partially overlaps a previously traversed path. The controller 46 may control the motors 38 corresponding to such one or more openers 16 along the overlapped portions to reduce or eliminate over-application of the one or more agricultural products to those overlapped portions of the field 56. Additionally, or in the alternative, the agricultural implement 10 may travel across the field 56 along rows 58 or portions of rows 58 with different soil conditions for which different rates and/or compositions of the one or more agricultural products should be applied. Additionally, the controller 46 may independently control the motors 38 of the metering assemblies 62 increase the efficiency of application of the one or more agricultural products to the edges of a field 56, such as the field illustrated in FIG. 2 in which the rows 58 are not perpendicular to an edge 104 of the field 56. That is, independent control of the motors 38 may enable the application of the one or more agricultural products without over-applying to a headrow portion 106 or under-applying to row ends 108 of the field 56.

As discussed above, the controller 46 may be disposed on the air cart 12, the agricultural implement 10, or the vehicle 8. The controller 46 includes a processor 110 (e.g., a microprocessor) that may execute software, such as software for controlling the metering assemblies 62 of the agricultural product delivery system 48. Moreover, the processor 110 may include multiple microprocessors, one or more "general-purpose" microprocessors, one or more special-purpose microprocessors, and/or one or more application specific integrated circuits (ASICS), or some combination thereof. For example, the processor 110 may include one or more reduced instruction set (RISC) processors. The controller 46 includes a memory device 112 that may store information such as control software, look up tables, configuration data, etc. The memory device 112 may include a volatile memory, such as random access memory (RAM), and/or a nonvolatile memory, such as read-only memory (ROM). The memory device 112 may store a variety of information and may be used for various purposes. For example, the memory device 112 may store processor-executable instructions (e.g., firmware or software) for the processor 110 execute, such as instructions for controlling the agricultural product delivery system 48. In some embodiments, the memory device 112 is one or more tangible, non-transitory, computer-readable media that may store machine-readable instructions for the processor 110 to execute. The memory device 112 may include ROM, flash memory, a hard drive, or any other suitable optical, magnetic, or solid-state storage medium, or a combination thereof. The memory device 112 may store data (e.g., position data, identification data, etc.), instructions (e.g., software or firmware for controlling the agricultural vehicle, etc.), any other suitable data, or a combination thereof. In some embodiments, the controller 46 may receive feedback from the flow sensors 89 of the metering systems 63. In some embodiments, the controller 46 may automatically determine the delivery delay based on the timing of feedback from the flow sensors and the timing of when there is a change in the state of the motors of the metering devices (e.g., from ON to OFF, or from OFF to ON). The automatically determined delivery delay may be stored in the memory 112 of the controller 46.

Figure 3:
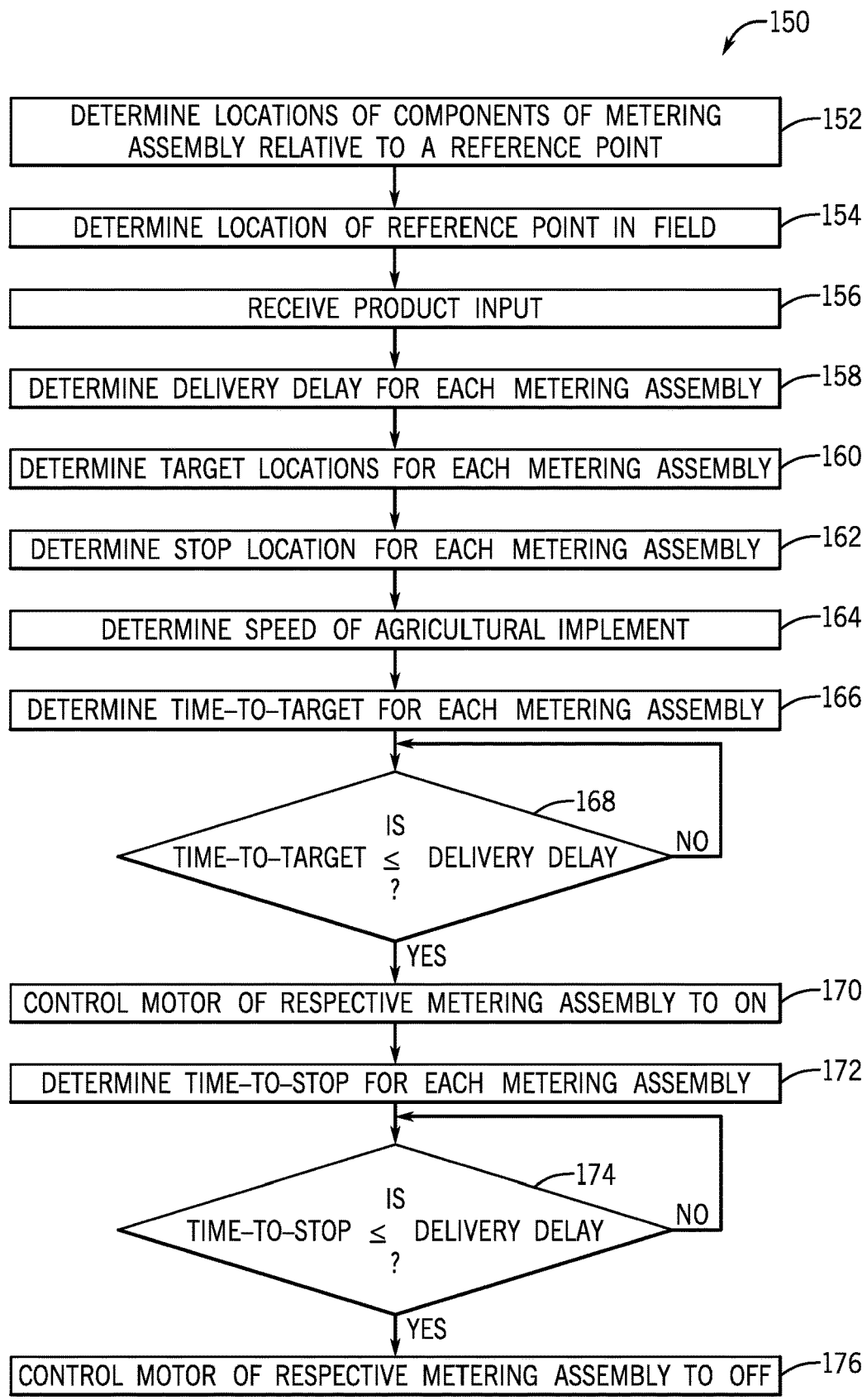
FIG. 3 is an embodiment of a method to deliver agricultural products from the metering systems of the agricultural implement to desired target locations on the field.

FIG. 3 illustrates an embodiment of a method 150 to deliver the one or more agricultural products to desired target locations on the field. The controller may determine (block 152) the locations of one or more components of the metering assemblies relative to a reference point of the agricultural product delivery system 48. In some embodiments, the locations of the one or more components in various configurations of agricultural product delivery system are stored in the memory of the controller, and the controller determines the locations based on an input of the configuration of the agricultural product delivery system. For example, the locations of the one or more components of the metering system are different for a first configuration with the location device on the agricultural implement rather than a second configuration with the location device on the vehicle.

The controller determines (block 154) the location of the reference point of the agricultural product delivery system in the field. As discussed above, the location device, such as a GPS or local positioning system, may provide location feedback to the controller. The controller determines the location of the reference point of the agricultural product delivery system in the field based on the received location feedback. The controller may receive (block 156) product input from an operator of the agricultural product delivery system. For example, the controller may receive an input of the one or more types of agricultural product in the product containers to be delivered to the field, the quantities of the one or more agricultural products to deliver to the field, a mixture ratio of multiple agricultural products to deliver to the field, or any combination thereof. The types of agricultural products may include, but are not limited to seeds (e.g., canola, soybeans, wheat, rice, rye, corn, barley, oats), fertilizers (e.g., urea, phosphate, sulfur, nitrogen fertilizers, potassium fertilizers), and inoculants. The controller may receive the input from an interface on the controller or from another user interface of the agricultural product delivery system, such as in a cab of the vehicle. In some embodiments, the product input includes a path length of the distribution hoses and primary lines of the metering assemblies.

The controller determines (block 158) the delivery delay for each metering assembly. As discussed above, the delivery delay is based at least in part on the path length of the primary line and distribution hose of the metering assembly from the metering device to the opener. Moreover, the product input received at block 156 may affect the determined delivery delay. In some embodiments, the controller may adjust or scale the delivery delay based on the type of product to be routed through the distribution hose. The metering assemblies with longer distribution hoses and primary lines may have greater delivery delays. In some embodiments, the controller determines the delivery delay via a lookup table stored in a memory based on a path length of the distribution hose and the primary line. In some embodiments, the controller may determine the delivery delay based on the timing of feedback from the flow sensors and the timing when the state of the motors of the metering devices are controlled (e.g., changed) to an ON or OFF state. In some embodiments, the controller determines (block 158) the delivery delay for each metering section (e.g., group of openers) of the agricultural implement. In some embodiments, the controller determines (block 158) the delivery delay for one or more openers of each metering section of the agricultural implement.

The controller determines (block 160) target locations in the field for application of the one or more agricultural products. The controller may determine the target locations prior to or while moving the agricultural implement in the field. The target locations may be determined within boundaries (e.g., edges) of a field that have not yet received the one or more agricultural products. The target locations may begin at the planned row ends in the field. In some embodiments, the controller loads a map from a memory, where the map includes target locations (e.g., rows) within the field. Additionally, or alternatively, the controller may load or determine a planting pattern with target locations within the field. The controller may update the target locations while delivering agricultural product to the field, such that portions of the field that have received the one or more agricultural products may not be targeted for subsequent application of agricultural product by overlapping passes. The controller may determine (block 162) stop locations in the field to stop application of the one or more agricultural products. The stop locations may be determined outside the boundaries (e.g., edges) of the field, differently elevated (e.g., high, low) locations in the field, the row ends, and/or portions of the field that have already received the one or more agricultural products.

The controller determines (block 164) the speed of the agricultural implement in the field. In some embodiments, the controller may determine the speed based on feedback from the location device. Additionally, or alternatively, the controller may determine the speed from the vehicle or a speed sensor on the agricultural implement or the air cart. Based at least in part on the determined speed, the determined locations of components of the agricultural product delivery system, and the target locations, the controller may determine (block 166) the time-to-target for each metering assembly or metering section. For example, the controller may determine that the time-to-target for a first metering assembly and a second metering assembly is 5 seconds. However, the time-to-target for each metering assembly may be different, such as if the rows are not perpendicular to an edge of the field, as illustrated in FIG. 2.

While travelling across the field, the controller compares (node 168) the time-to-target for each metering section to the delivery delay for the respective metering section. If the time-to-target is greater than the delivery delay, then the controller may repeat the comparison after a waiting period (e.g., 0.05 to 0.5 seconds). If the time-to-target is less than or equal to the delivery delay, then the controller may control (block 170) the motor of the metering assembly for the respective metering section to an ON state to direct the one or more agricultural products into the primary line and distribution hoses for application to the field by the openers of the respective metering section. Continuing the previous example, if the delivery delay for the first metering assembly is 3 seconds, then the controller may control the motor of the first metering assembly to the ON state when the time-to-target is 3 seconds or less. Likewise, if the delivery delay for the second metering assembly is 1 second, then the controller may control the motor of the second metering assembly to the ON state when the time-to-target is 1 second or less. Accordingly, the controller may independently control the motors of the metering assemblies to compensate for different delivery delays and different target locations of the metering assemblies.

Based at least in part on the determined speed, the determined locations of components of the agricultural product delivery system, and the target locations in the field, the controller may determine (block 172) the time-to-stop for each metering assembly or metering section. For example, the controller may determine that the time-to-stop for a first metering assembly and a second metering assembly is 5 seconds. However, the time-to-stop for each metering assembly may be different, such as if the rows are not perpendicular to an edge of the field, as illustrated in FIG. 2.

While travelling across the field, the controller compares (node 174) the time-to-stop for each metering assembly to the delivery delay (e.g., cutoff delay) for the respective metering assembly. If the time-to-stop is greater than the delivery delay, then the controller may repeat the comparison after a waiting period (e.g., 0.05 to 0.5 seconds), thereby continuing delivery of the agricultural product via the openers of the metering assembly. If the time-to-stop is less than or equal to the delivery delay, then the controller may control (block 176) the motor of the respective metering assembly to an OFF state to stop directing the one or more agricultural products into the primary lines and distribution hoses for application to the field by the respective metering section. Continuing the previous example, if the delivery delay for the first metering assembly is 3 seconds, then the controller may control the motor of the first metering assembly to the OFF state when the time-to-stop is 3 seconds or less. Likewise, if the delivery delay for the second metering assembly is 1 second, then the controller may control the motor of the second metering assembly to the OFF state when the time-to-stop is 1 second or less. Accordingly, the controller may independently control the motors of the metering assemblies to compensate for different delivery delays and different stop locations of the metering assemblies.

It is appreciated that the steps of the method 150 to deliver the one or more agricultural products to desired target locations on the field may be performed in a different order than illustrated in FIG. 3. Moreover, one or more of the steps may be repeated during operation of the agricultural implement. For example, the location device of the agricultural product delivery system may determine the location of the reference point in the field repeatedly while the agricultural implement is in operation in the field. Also, the controller may repeatedly control a metering assembly through steps 166 to 176 to start and stop delivery of the one or more agricultural products to rows of the field through planting pattern of the field. Also, the controller may independently control the motors of the respective metering assemblies according to steps 166 to 176 to independently control the delivery of the one or more agricultural products to the rows of the field according to a planting pattern.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural product delivery system comprising a controller, wherein the controller comprises a non-transitory computer readable medium configured to store instructions, and a processor configured to execute the instructions, wherein the instructions comprise instructions to:
   determine a first time-to-target of a first metering section of an agricultural implement in a field;
   determine a second time-to-target of a second metering section of the agricultural implement in the field;
   control a first motor coupled to the first metering section to an ON state when the first time-to-target is less than or equal to a first delivery delay of the first metering section; and
   control a second motor coupled to the second metering section to the ON state when the second time-to-target is less than or equal to a second delivery delay of the second metering section.

2. The agricultural product delivery system of claim 1, wherein the first time-to-target is based at least in part on a speed of the agricultural implement in the field, a first position of the first metering section on the agricultural implement, and a first distance from the agricultural implement to a first row end for the first metering section.

3. The agricultural product delivery system of claim 2, wherein the second time-to-target is based at least in part on the speed of the agricultural implement in the field, a second position of the second metering section on the agricultural implement, and a second distance from the agricultural implement to a second row end for the second metering section, wherein the first time-to-target is different than the second time-to-target.

4. The agricultural product delivery system of claim 1, wherein the first delivery delay is different than the second delivery delay.

5. The agricultural product delivery system of claim 1, wherein the first delivery delay is based at least in part on a first path length of a first metering assembly, the second delivery delay is based at least in part on a second path length of a second metering assembly, the first metering assembly comprises a first primary line coupled between the first motor and the first metering section, and the second metering assembly comprises a second primary line coupled between the second motor and the second metering section.

6. The agricultural product delivery system of claim 1, wherein the instructions comprise instructions to:
   determine a first time-to-stop of the first metering section of the agricultural implement in the field;
   determine a second time-to-stop of the second metering section of the agricultural implement in the field;
   control the first motor coupled to the first metering section to an OFF state when the first time-to-stop is less than or equal to the first delivery delay of the first metering section; and
   control the second motor coupled to the second metering section to the OFF state when the second time-to-stop is less than or equal to the second delivery delay of the second metering section.

7. The agricultural product delivery system of claim 1, wherein the instructions comprise instructions to:
   receive an input that corresponds to a type of agricultural product to be delivered to the field, wherein the type of agricultural product comprises seeds, fertilizers, inoculants, or any combination thereof; and
   adjust the first delivery delay and the second delivery delay based on the operator input.

8. The agricultural product delivery system of claim 1, wherein the instructions comprise instructions to:
   determine a location in the field of a reference point of the agricultural product delivery system based on location feedback from a location device of the agricultural product delivery system, wherein the location device is configured to determine the location in the field based on location feedback from a Global Positioning System (GPS) or a fixed local coordinate system;
   determine the first time-to-target based on the determined location of the reference point and a first reference distance from the first metering section to the reference point; and
   determine the second time-to-target based on the determined location of the reference point and a second reference distance from the second metering section to the reference point.

9. An agricultural product delivery system, comprising:
   a first metering assembly comprising:
      a first metering section comprising:
         a first opener disposed at a first location on an agricultural implement; and
         a first distribution hose coupled to the first opener;
      a first motor configured to control a first flow of a first agricultural product into a first primary line coupled to the first distribution hose, wherein the first metering assembly comprises a first path length through the first primary line and the first distribution hose; and
   a second metering assembly comprising:
      a second metering section comprising:
         a second opener disposed at a second location on the agricultural implement; and a second distribution hose coupled to the second opener;

a second motor configured to control a second flow of a second agricultural product into a second primary line coupled to the second distribution hose, wherein the second metering assembly comprises a second path length through the second primary line and the second distribution hose; and a controller coupled to the first motor and the second motor, wherein the controller is configured to control the first motor based at least in part on the first path length, to control the second motor based at least in part on the second path length, and to independently control the first motor and the second motor.

10. The agricultural product delivery system of claim 9, comprising a cart coupled to the agricultural implement, wherein the first motor and the second motor are disposed on the product cart.

11. The agricultural product delivery system of claim 10, wherein the second agricultural product is the first agricultural product.

12. The agricultural product delivery system of claim 9, wherein the first metering section comprises a first flow sensor coupled to the first distribution hose, the second metering section comprises a second flow sensor coupled to the second distribution hose, the controller is configured to determine the first path length based at least in part on first feedback from the first flow sensor, and the controller is configured to determine the second path length based at least in part on second feedback from the second flow sensor.

13. The agricultural product delivery system of claim 9, wherein the controller is configured to control the first motor to deliver the first agricultural product to the first opener at a first time, and the controller is configured to control the second motor to deliver the second agricultural product to the second opener at a second time that is different than the first time.

14. The agricultural product delivery system of claim 13, wherein the controller is configured to determine the first time based at least in part on a speed of the agricultural implement, the first location, and a first distance from the agricultural implement to a first row end of the first row for the first metering section.

15. The agricultural product delivery system of claim 13 wherein the first metering section comprises a first flow sensor coupled to the first distribution hose, and the controller is configured to determine the first time based at least in part on first feedback from the first flow sensor.

16. The agricultural product delivery system of claim 9, wherein the first metering section comprises a first distribution header coupled to the first primary line, the first distribution hose, and a third distribution hose coupled to a third opener, and the second metering section comprises a second distribution header coupled to the second primary line, the second distribution hose, and a fourth distribution hose coupled to a fourth opener.

17. A method of controlling delivery of an agricultural product to a field from a plurality of metering sections of an agricultural implement, comprising:

determining a first delivery delay for a first metering assembly based at least in part on first flow feedback from a first flow sensor of the first metering assembly and first state change of a first motor of the first metering assembly;

controlling the first motor of the first metering assembly to deliver the agricultural product to the field via a first metering section of the first metering assembly based at least in part on the first delivery delay;

determining a second delivery delay for a second metering assembly based at least in part on second flow feedback from a second flow sensor of the second metering assembly and a second state change of a second motor of the second metering assembly; and controlling the second motor of the second metering assembly to deliver the agricultural product to the field via a second metering section of the second metering assembly based at least in part on the second delivery delay and independent of the first delivery delay.

18. The method of claim 17, comprising:

determining a location of a reference point of the agricultural implement in the field;

determining a first time-to-target of the first metering assembly based at least in part on a first target in the field for the first metering section and the determined location of the reference point;

determining a second time-to-target of the second metering assembly based at least in part on a second target in the field for the second metering section and the determined location of the reference point;

controlling the first motor based at least in part on the first delivery delay and the first time-to-target; and controlling the second motor based at least in part on the second delivery delay and the second time-to-target.

19. The method of claim 18, wherein determining the location of the reference point of the agricultural implement in the field comprises receiving location feedback from a Global Positioning System (GPS).

20. The method of claim 17, comprising:

receiving an input based on a type of the agricultural product; and adjusting the first delivery delay for the first metering system and adjusting the second delivery delay for the second metering system based on input of the type of the agricultural product.

* * * * *